(No Model.)
A. W. ROBINSON.
BEARING FOR AMALGAMATOR SCREENS.
No. 523,408. Patented July 24, 1894.
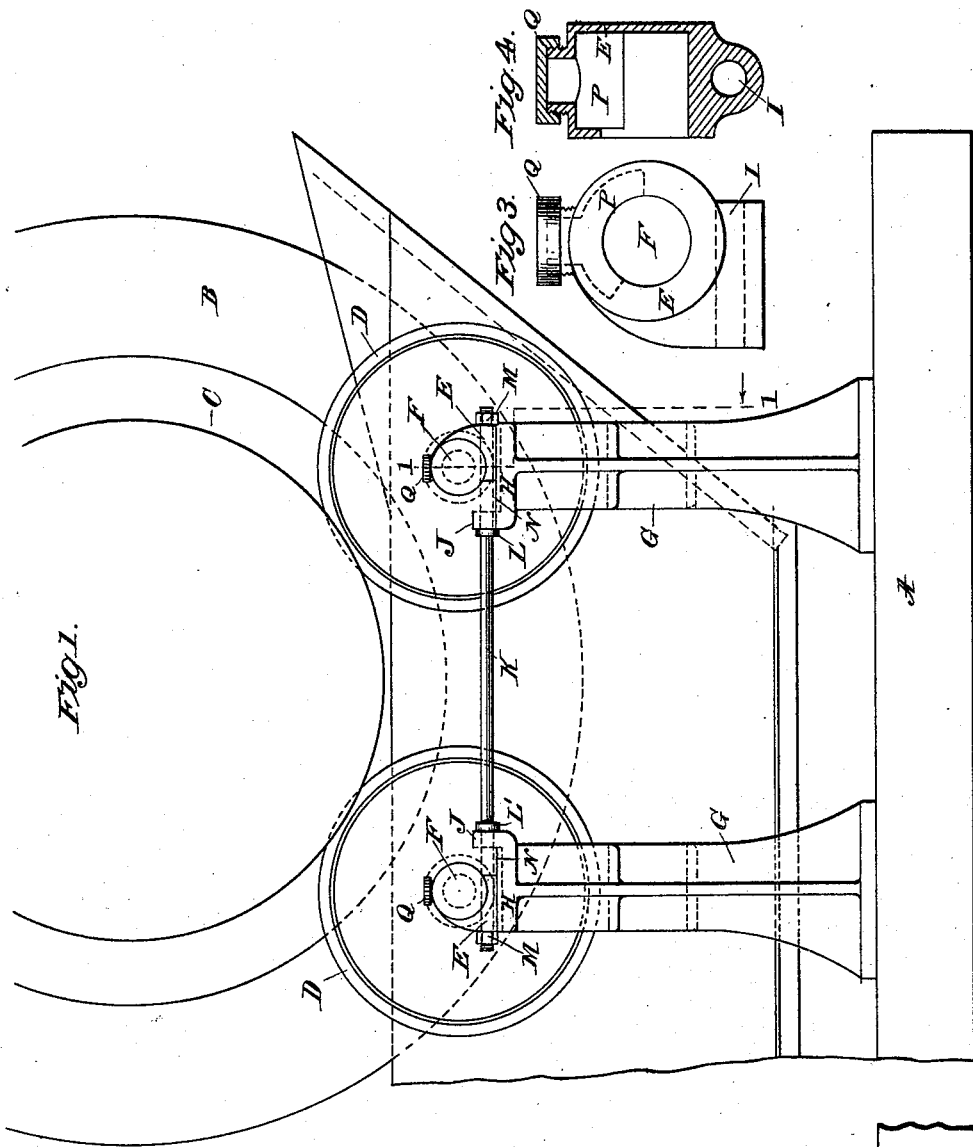
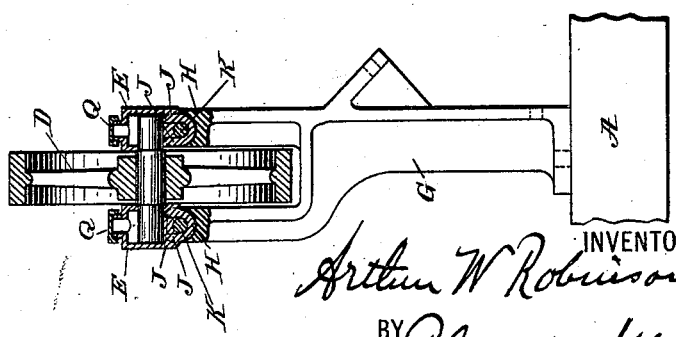
WITNESSES:
Edward C. Rowland.
John E. Lacey.
INVENTOR
Arthur W. Robinson
BY Phillips Abbott
ATTORNEY

UNITED STATES PATENT OFFICE.

ARTHUR W. ROBINSON, OF MILWAUKEE, WISCONSIN.

BEARING FOR AMALGAMATOR-SCREENS.

SPECIFICATION forming part of Letters Patent No. 523,408, dated July 24, 1894.

Application filed November 23, 1893. Serial No. 491,752. (No model.)

*To all whom it may concern:*

Be it known that I, ARTHUR W. ROBINSON, a citizen of the United States, and a resident of Milwaukee, in the county of Milwaukee and State of Wisconsin, have invented certain new and useful Improvements in Bearings for Amalgamator-Screens, of which the following is a specification.

The object of my invention is to improve the bearings of rotary screens in amalgamating machines and similar structures, so that the weight on the bearings is evenly distributed throughout their entire length, and also so that the anti-friction wheels or rollers, upon which the screen is supported may be adjusted independently of each other, and without disorganizing or taking down the screen or any part of the apparatus, so that any unevenness in position and wear of the parts may be compensated for, and also so that the axis of the screen may be made to turn evenly and truly, and the action of the sprocket chain or gear or other power transmitting mechanism, which drives the screen, made smooth and even, irrespective of the position of the support on which the amalgamator rests, which is apt to vary, from time to time, especially if the amalgamator be mounted upon a platform car, or equivalent structure. Also, under my construction, the bearings themselves are inexpensively made and can be readily removed in the event of their fracture or wearing out.

In the drawings hereof, Figure 1, illustrates a side elevation of the screen and its bearings, one end of the amalgamator tank being also indicated. Fig. 2, illustrates a vertical sectional view of one of the pillars supporting one of the anti-friction rollers, taken on the line 1, 1, of Fig. 1. Fig. 3, illustrates an elevation of one of the bearings. Fig. 4, illustrates a vertical section of the bearing shown in Fig. 3.

A is the base of the machine, shown in this instance as being a stick of timber. It may, however, be the top of a platform car, or any other suitable support.

B is the screen.

C is the bearing surface at one side of the machine, which rests upon the anti-friction rollers.

D, D are the anti-friction rollers or wheels.

E, E are the adjustable bearings in which the rollers are supported on axes F.

G are the pillars on which the bearings are supported. The pillars are bifurcated at their upper ends as shown in Fig. 2, and on each of the bifurcations there is a slideway H, upon which the bearings E slide. The bearings are preferably, but not necessarily made half round on their under surface, and the slideways on the pillars are made of the same shape as shown, so as to retain the bearings properly in place. In the lower portion of the bearings there is a hole I made through from side to side, and on the inner sides of each of the slideways there are upwardly extending lugs J, J, &c.

K is a rod which is provided with two collars L, L', which snugly fit against the lugs J, the rod lying in the opening between the two lugs, on each side of the wheel. The ends of the rod K are threaded and on each end there is a large, strong nut M.

It will be observed that the base of the bearings E is not so long as the slideway H. On the contrary, there is a space N on each slideway, about equal to one-half of the length of the base of the bearing, through which the bearing may slide.

O is an opening in the top of the bearings, which connects with a grease chamber P below, which is open to the interior of the bearing. A cap Q covers the opening to exclude dirt and other foreign matter.

The operation is obvious. The rod K is prevented from longitudinal movement in either direction by reason of the collars L, L', which abut against the lugs J, J, &c., at both sides. All of the rods are, of course, provided with these collars, and it will be seen that by setting up or letting down the nuts M on the ends of the threaded rods K, the bearings E, and consequently the rollers or wheels D may be adjusted in any desired position resulting in an elevation or depression of one side or the other of the revolving screen, as necessity will require, to secure smooth action, as above suggested or to take up wear of the parts, and it will also be seen that each one of the anti-friction wheels or rollers D may be moved without disturbing any other one in the entire set of eight rollers; and also that the adjustment is done without disturbing or moving any part of the apparatus, excepting to turn the nut or nuts M. These nuts are made large and strong, so that a powerful wrench, being applied to them, they may be moved as desired, and it will also be observed, that in the event of fracture or wear, necessitating replacement, any one of the rollers can be taken out and another one inserted by simply running off the nut M, and pulling the bearing backwardly and off from the rod, when another may be quickly supplied. Meantime, the screen will be properly supported by the other rollers or wheels.

I desire to call special attention to the fact that in my construction, each of the rollers D, which support the screen, is supported upon its own axis, and that each end of each axis is provided with the adjustable bearings, so that each end of the axis of each wheel may be independently adjusted, and furthermore, that the rod K, which takes the strain, extends across from pillar to pillar G, G, thus relieving them of all strain, excepting that in vertical lines; and furthermore, that there is a rod, K, for each pair of adjustable bearings. By reason of this construction, I can secure adjustments which are impossible, as I believe, with any prior mechanism, and which are exceedingly important because the foundation upon which machinery of this character rests is frequently a platform car, a rudely constructed building, or equivalent unstable structure, the levels of which are continually liable to change, necessitating equivalent modifications in the adjustment, in order to secure the best results.

I do not limit myself to the details of construction shown and described, since it will be apparent to those who are familiar with this art, that modifications may be made therein and still the essentials of my invention be employed.

I claim—

1. In an amalgamator or like machine, the combination of a rotary screen, a pair of anti-friction rollers or wheels on each side of the machine, an axis for each anti-friction wheel, horizontally sliding bearings for each end of each axis, a slide way for each bearing, a rod connecting each pair of bearings on the opposing wheels, provided with nuts whereby the bearings are adjusted, substantially as set forth.

2. In an amalgamator or like machine, the combination of a rotary screen, a pair of anti-friction rollers or wheels on each side of the screen, an axis for each anti-friction wheel, horizontally sliding bearings for each end of each axis, a slide way for each bearing, a rod connecting each pair of bearings on the opposing wheels, provided with nuts, whereby the bearings are adjusted, and provided also with collars, which engage with and locate the said rods relative to the slide ways, substantially as set forth.

Signed at Milwaukee, in the county of Milwaukee and State of Wisconsin, this 8th day of November, A. D. 1893.

ARTHUR W. ROBINSON.

Witnesses:
JOHN C. WILLIAMS,
J. G. DAVIES.